June 22, 1943. C. G. GERHOLD ET AL 2,322,354
SEPARATION OF SELECTED COMPONENTS FROM HYDROCARBON MIXTURES
Filed May 22, 1939
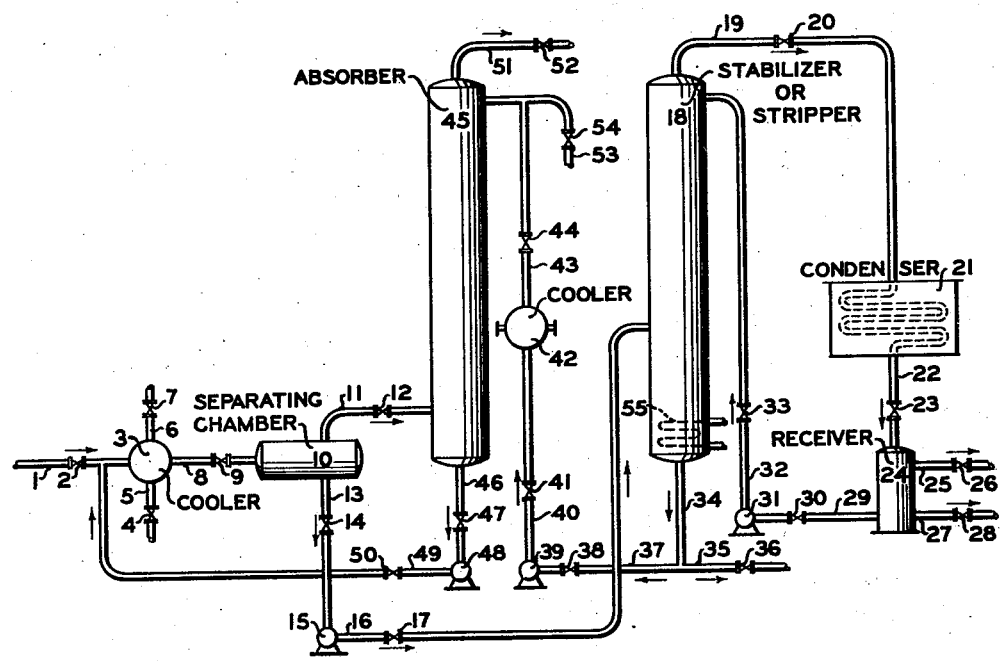
INVENTORS
CLARENCE G. GERHOLD
BERNARD J. FLOCK
BY
ATTORNEY Patented June 22, 1943

2,322,354

UNITED STATES PATENT OFFICE 2,322,354

SEPARATION OF SELECTED COMPONENTS FROM HYDROCARBON MIXTURES

Clarence G. Gerhold and Bernard J. Flock, Chicago, Ill., assignors to Universal Oil Products Company, Chicago, Ill., a corporation of Delaware Application May 22, 1939, Serial No. 274,870

5 Claims. (Cl. 196—8)

The invention relates to the separation of selected components from a mixture of materials of relatively wide boiling range and is particularly applicable to the treatment of either normally gaseous hydrocarbons or mixtures of normally gaseous and normally liquid hydrocarbons.

The invention involves the use of separating, distilling and absorption steps connected to function in an interdependent and cooperative manner which results in better segregation of the several selected fractions of the mixture supplied to the system than is obtainable in conventional equipment operated in a conventional manner.

Although the invention is not limted to the treatment of a mixture of any specific composition nor to the treatment of hydrocarbons generally, its features and advantages can be more clearly illustrated as applied to the treatment of specific mixtures. The subsequent description and explanation is therefore directed to two different types of operation which will serve to illustrate the features of the invention and flexibility of the process.

One specific embodiment of the invention, which applies to the treatment of a mixture of normally gaseous and normally liquid hydrocarbons such as, for example, a stream of fractionated vaporous products resulting from the pyrolytic conversion of hydrocarbon oils, comprises cooling the mixture, which is supplied to the system in essentially vaporous state, under temperature and pressure conditions regulated to effect condensation of substantially all of its normally liquid components and in the presence of a sufficient quantity of added liquid to absorb in the resulting commingled liquids a major portion of the high-boiling fractions of the normally gaseous components of the mixture, separating the resulting cooled materials into a gaseous medium and a liquid medium, contacting said gaseous medium with an absorber oil under temperature and pressure conditions regulated to absorb therefrom substantially all of the remaining relatively heavy gases, removing the remaining unabsorbed low-boiling gases from the system and returning resulting enriched absorber oil to the aforementioned cooling step as said added liquid.

In this particular instance the purpose of the invention is to separate the mixture supplied to the system into three selected fractions, one of which comprises gasoline of the desired vapor pressure and another of which consists essentially of a relatively heavy normally gaseous fraction containing a high concentration of readily polymerizable olefins such as propene and butenes, while the other fraction comprises substantially all of the remaining lighter gases and is substantially devoid of readily polymerizable olefins. In such cases, the readily polymerizable olefins will be largely concentrated as dissolved gases in the liquid medium removed from the aforementioned separating step and to accomplish the above stated purpose of the invention, this liquid medium is supplied to a fractionating or stabilizing step wherein regulated quantities of the dissolved gases are liberated therefrom and recovered as said normally gaseous fraction rich in polymerizable olefins and remaining unvaporized components of the liquid medium resulting from said stabilization are recovered as said stabilized gasoline of the desired vapor pressure. In the preferred embodiment of this particular aspect of the invention, a regulated quantity of the stabilized distillate is cooled and supplied to the aforementioned absorption step wherein it functions as absorber oil to recover from said gaseous medium substantially all the remaining desirable high-boiling fractions of the gases.

Another specific embodiment of the invention applies to the treatment of a mixture of essentially gaseous hydrocarbons and hydrogen, such as that resulting, for example, from the catalytic dehydrogenation of butanes and consisting predominantly of butenes, unconverted butanes, some lower boiling hydrocarbon gases and substantial quantities of hydrogen. This mixture is cooled in the presence of added liquid under temperature and pressure conditions regulated to absorb a major portion of the butane-butene fractions and leave substantially all of the lower boiling hydrocarbon gases and hydrogen unabsorbed. The resulting cooled materials are separated into a gaseous and a liquid medium, the latter being subjected to vaporization and fractionation to separate the dissolved butane-butene fractions which are recovered from said added liquid, which remains unvaporized. The gaseous medium is contacted with absorber oil to recover substantially all of the remaining butane-butene fractions therefrom, the remaining unabsorbed low-boiling gases, which consist essentially of hydrogen and hydrocarbons boiling below the range of butane, being removed from the absorption step and resulting enriched absorber oil being supplied to the aforementioned cooling step as said added liquid. In this operation, suitable hydrocarbon oil from an external source, such as, for example, a substantially gas-free distillate, is required as absorber oil in starting the operation, this absorber oil being subsequently recovered from the vaporizing and fractionating step as the unvaporized components of said liquid medium and is preferably cooled and returned to the absorption step for use therein as absorber oil. After this cyclic operation is established, the original absorber oil is continuously recovered from within the system for further use.

Each of the specific types of operation above described, as well as any other specific operation applied to different charging stocks, may be conducted in the same general form of apparatus and one specification of apparatus suitable for this purpose is illustrated in the accompanying diagrammatic drawing.

Referring to the drawing, the mixture to be treated is supplied to cooler 3 through line 1 and valve 2, together with added liquid supplied to this zone through line 49, as will be later described, and the temperature of the commingled materials is reduced as they pass through cooler 3 sufficiently to extract heat of absorption and, when desired, to effect some condensation of the heavy normally gaseous components of the mixture by indirect heat exchange between the commingled materials and water or other suitable cooling liquid which is supplied to condenser 3 through line 4 and valve 5 and removed therefrom through line 6 and valve 7.

The resulting cooled materials are supplied from cooler 3 through line 8 and valve 9 to separating chamber 10 wherein they are separated into a vaporous or gaseous medium and a liquid medium. The former is supplied from receiver 10 through line 11 and valve 12 to absorber 45 wherein it is intimately and countercurrently contacted with a suitable absorption liquid which may be either supplied to the absorber from an external source through line 53 and valve 54 or recovered from within the system and supplied to absorber 45, as will be later described.

Temperature and pressure conditions in absorber 45 and the quantity and nature of the absorber oil supplied thereto are regulated to effect absorption of substantially all of the desired high-boiling components which remain in the material supplied to this zone from chamber 10. The remaining unabsorbed relatively low-boiling components of these materials are directed from the upper portion of the absorber through line 51 and valve 52 to storage or elsewhere, as desired. The resulting enriched absorber oil is directed from the lower portion of the absorber through line 46 and valve 47 to pump 48 by means of which it is supplied through line 49 and valve 50 to cooler 3 as the aforementioned added liquid.

The liquid medium recovered in chamber 10 is directed therefrom through line 13 and valve 14 to pump 15 by means of which it is supplied through line 16 and valve 17 to stabilizer or stripper 18 and therein subjected to vaporization and fractionation under conditions regulated to separate all or any desired portion of the relatively low-boiling components of said liquid medium therefrom, leaving as unvaporized components of the liquid medium an oil sufficiently free of dissolved gases to function as a good absorption medium in absorber 45 and liberating from the liquid medium as vaporized and fractionated components, all or a regulated portion of the desired intermediate fractions of the charging stock condensed and/or absorbed in cooler 3.

The vaporized and fractionated materials are, in the particular case here illustrated, directed from the upper portion of stripper 18 through line 19 and valve 20 to condenser 21 wherefrom the resulting condensate and any relatively light uncondensed gases are directed through line 22 and valve 23 to receiver 24. All or a regulated portion of this condensate is directed from receiver 24 through line 27 and valve 28 to storage or further treatment, as desired, and any uncondensed gases are directed from the receiver through line 25 and valve 26 to storage or elsewhere, as desired. Preferably, a regulated quantity of the condensate collected in receiver 24 is returned therefrom by means of line 29, valve 30, pump 31, line 32 and valve 33 to the upper portion of the stabilizer wherein it functions as a cooling and refluxing medium.

It is, of course, also within the scope of the invention to employ any other suitable means of controlling the top temperature in the stabilizer or stripper and obtaining a refluxing medium in this zone such as, for example, by passing a suitable cooling medium through a closed coil disposed in the upper portion of the stabilizer in indirect heat exchange with the vapors and/or gases undergoing fractionation therein. The invention also contemplates recovering or supplying the vaporized and fractionated materials removed from the upper portion of the stabilizer or stripper 18 to any desired further treatment without prior condensation, but in most instances it is advantageous to condense these materials to facilitate subsequent handling, particularly when, as in the two examples above given, these materials consist predominantly of relatively heavy gases containing a high concentration of readily polymerizable olefins, since this material may be best supplied to a catalytic polymerizing system for further treatment in essentially liquid state.

Suitable reboiling or heating means such as closed coil 55, through which a suitable heating medium is passed, may be employed in the lower portion of stabilizer or stripper 18 or the required reboiling of the bottoms may be, when desired, accomplished in a zone external to column 18. The invention also contemplates supplying a portion or all of the heat required for distillation of the liquid medium to the same in transit from chamber 10 to column 18 by any suitable well known means, not illustrated.

The stabilized or substantially stripped liquid medium is removed from the lower portion of column 18 through line 34 and may be directed, all or in part, through line 35 and valve 36 to cooling and storage or elsewhere, as desired. Preferably, however, a regulated quantity of this material is cooled and returned to absorber 45 for use therein as absorber oil, this being accomplished by means of line 37, valve 38, pump 39, line 40, valve 41, cooler 42, line 43 and valve 44.

It will be apparent that the operating conditions employed in the different zones of the system will vary considerably, depending upon the nature of the charging stock, the relative proportions of its various components and the particular separation of said components which is desired. Since determination of suitable conditions for accomplishing the desired results with various types and compositions of charging stock is within the skill of those familiar with the design of conventional separating and recovery equipment, no attempt is made herein to define the limits of suitable operating conditions for the many various types of operation in which the features of the invention may be advantageously utilized. However, to illustrate the operativeness of the process and its advantages, the following example of one specific operation is given.

The charging stock is a stream of overhead vapors from the fractionator of a cracking system and has the following approximate analysis:

| Fraction | Mol % |
| --- | --- |
| Gas lighter than propene | 22.0 |
| Propene | 5.2 |
| Propane | 7.8 |
| Butenes | 4.9 |
| Butanes | 5.1 |
| Normally liquid fractions (essentially gasoline) | 55.0 |
| | 100% |

This mixture is supplied to condenser 3, together with enriched absorber oil from absorber 45 and the commingled materials are cooled in condenser 3 to a temperature of about 90° F., at a superatmospheric pressure of approximately 100 pounds per square inch and supplied under these conditions to separating chamber 10. The gaseous medium supplied from chamber 10 to absorber 45 contains about 81.5 mol % of gases lighter than propene, about 13.5 mol % of propane and propene and about 5.0 mol % of butanes and butenes.

Absorber 45 is operated at a superatmospheric pressure of approximately 100 pounds per square inch with a top temperature of approximately 100° F., and a bottom temperature of about 120° F. The unabsorbed gases removed from this zone are substantially free of butanes and butenes and contain about 7.5 mol % of propane and propene, the remainder being lighter gases. The enriched absorber oil is returned from the lower portion of absorber 45 to condenser 3.

The liquid medium removed from chamber 10 is supplied to stabilizer 18 which is also operated at a superatmospheric pressure of approximately 100 pounds per square inch with a top temperature of about 120° F., and a bottom temperature of approximately 350° F. Approximately 75% of the stabilized liquid removed from the lower portion of stabilizer 18 is recovered as stabilized gasoline having a Reid vapor pressure of approximately 4 pounds per square inch and amounting to approximately 56 mol % of the charging stock. The remainder is cooled to a temperature of approximately 90° F., and supplied to the upper portion of absorber 45 for use therein as absorber oil.

The composition of the overhead vaporous stream removed from stabilizer 18 is approximately as follows:

| Fraction | Mol % |
| --- | --- |
| Gases lighter than propene | 28.6 |
| Propene | 13.3 |
| Propane | 22.4 |
| Butenes | 17.3 |
| Butanes | 18.4 |
| | 100% |

This material is substantially condensed to form liquid polymerization stock which is recovered and refluxing liquid which is returned to the upper portion of the stabilizer. The polymerization stock amounts to approximately 25 mol % of the charging stock supplied to the system and, as indicated in the above table, contains approximately 30.6 mol % of readily polymerizable olefins.

We claim as our invention:

1. The process of separating a relatively light gaseous fraction rich in hydrogen and a relatively heavy normally gaseous fraction rich in readily polymerizable olefins from a stream of such materials, which comprises mixing said stream with a stream of hydrocarbon oil, thereafter passing the admixed streams through a cooling zone under temperature and pressure conditions regulated to form a liquid medium containing a major portion of said readily polymerizable olefinic components of the mixture and a gaseous medium containing substantially all of said hydrogen, separating said liquid and gaseous media, intimately contacting the latter with absorber oil substantially free of dissolved gases under temperature and pressure conditions regulated to absorb from the gases substantially all of their readily polymerizable olefinic components, removing the remaining unabsorbed gases as said fraction rich in hydrogen from the absorption step, commingling the resulting enriched absorber oil with the stream of gases as said hydrocarbon oil, fractionally distilling said liquid medium to vaporize substantially all of its normally gaseous components and separate the latter from substantially all normally liquid components of said liquid medium, recovering normally gaseous components thus liberated as said fraction rich in polymerizable olefins and supplying said normally liquid components to the absorption step as absorber oil.

2. The method of separating selected fractions from products resulting from catalytic dehydrogenation of butanes and consisting essentially of butenes, unconverted butanes, hydrogen and a small percentage of hydrocarbon gases boiling below butane, which comprises mixing a stream of said products with a stream of hydrocarbon oil, thereafter passing the admixed streams through a cooling zone under temperature and pressure conditions regulated to form a liquid medium containing a major portion of said butanes and butenes and a gaseous medium containing substantially all of said lighter hydrocarbon gases and hydrogen, separating said liquid and gaseous media, intimately contacting the latter with absorber oil substantially free of dissolved gases to absorb therefrom substantially all of its butane-butene components, recovering as the unabsorbed gases from the absorption step a fraction consisting predominantly of said lighter hydrocarbon gases and hydrogen and substantially devoid of butanes and butenes, commingling resulting enriched absorber oil with the stream of products as said hydrocarbon oil, fractionally distilling said liquid medium to vaporize therefrom substantially all of its butane-butene components and separate the same from substantially all of its normally liquid components, subjecting the evolved gases to condensation to form a normally gaseous condensate consisting predominantly of butanes and butenes, recovering a portion of said normally gaseous condensate, returning another portion thereof to the fractional distilling step as a cooling and refluxing medium and cooling and supplying said normally liquid components resulting from the fractional distilling step to the absorption step as absorber oil.

3. A method of separating selected components from a mixture of normally gaseous and normally liquid hydrocarbons consisting essentially of gasoline, readily polymerizable heavy olefinic gases, corresponding paraffins and lighter gases, which comprises cooling said mixture sufficiently to condense substantially all of its normally liquid components and dissolve substantial quantities of said heavy gases therein, separating the resulting gas-containing distillate from uncondensed and undissolved gases, stabilizing the distillate to a substantially reduced vapor pressure by liberating therefrom at least a major portion of the dissolved gases, recovering the gases thus liberated as a product consisting essentially of said heavy polymerizable olefins and corresponding paraffins, recovering a portion of the stabilized distillate, cooling and contacting another portion thereof with said uncondensed and undissolved gases in sufficient quantities and under temperature and pressure conditions regulated to absorb in said distillate substantially all of their heavy polymerizable olefinic components, removing the remaining unabsorbed low-boiling gases from the system and combining the gas-containing distillate from the absorption step with the mixture supplied to the first mentioned cooling step, whereby to increase the concentration of heavy gases and normally liquid components in the mixture supplied to this step and thereby increase the quantity of heavy polymerizable olefinic gases dissolved in the resulting distillate and recovered therefrom in the stabilization step.

4. A process for recovering $C_4$ hydrocarbons from a stream containing the same and lighter gases, which comprises combining the stream with a stream of hydrocarbon oil, thereafter cooling the resulting mixture under temperature and pressure conditions regulated to absorb the major portion of the $C_4$ hydrocarbons in said oil, separating the resulting liquid medium from unabsorbed gases, vaporizing absorbed $C_4$ hydrocarbons from said liquid medium, scrubbing said unabsorbed gases with thus denuded liquid medium to absorb heavier components of the former in the latter, and combining resultant enriched liquid medium with the stream of gases supplied to the cooling step as at least a portion of said hydrocarbon oil.

5. A process for recovering $C_4$ hydrocarbons from a stream containing the same and lighter gases, which comprises combining the stream with a stream of gasoline hydrocarbons, thereafter cooling the resulting mixture under temperature and pressure conditions regulated to absorb the major portion of the $C_4$ hydrocarbons in the gasoline, separating the resultant enriched gasoline from unabsorbed gases, stabilizing the former to liberate absorbed $C_4$ hydrocarbons therefrom, scrubbing said unabsorbed gases with at least a portion of the stabilized gasoline and then combining the enriched gasoline with the stream supplied to the aforesaid cooling step.

CLARENCE G. GERHOLD.
BERNARD J. FLOCK.